Nov. 15, 1966    C. G. MATASA ETAL    3,285,712
APPARATUS FOR THE NITRATION OF ORGANIC COMPOUNDS
IN GASEOUS PHASE
Original Filed Oct. 25, 1960
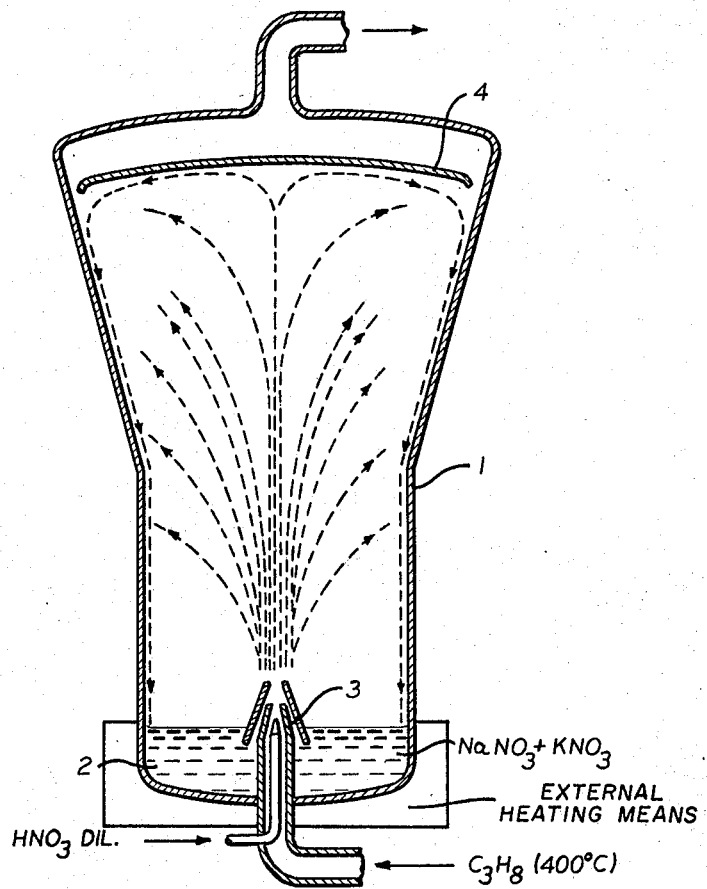
INVENTORS
CLAUDIU GHEORGHE MATASA
IOSIF DRIMUS
MARCEL KLANG
BY
Arthur O. Klein
THEIR
ATTORNEY.

United States Patent Office 3,285,712
Patented Nov. 15, 1966

3,285,712
APPARATUS FOR THE NITRATION OF ORGANIC COMPOUNDS IN GASEOUS PHASE
Claudiu G. Matasa, Iosif I. Drimus, and Marcel Klang, Bucharest, Rumania, assignors to Ministerul Industriei Petrolului si Chimiei, Bucharest, Rumania
Original application Oct. 25, 1960, Ser. No. 64,900, now Patent No. 3,115,527, dated Dec. 24, 1963. Divided and this application July 31, 1963, Ser. No. 298,876
Claims priority, application Rumania, Oct. 28, 1959, 43,015
7 Claims. (Cl. 23—285)

The instant application constitutes a divisional application of our copending application, filed on October 25, 1960, under Serial No. 64,900, and now Patent No. 3,115,527.

The present invention relates to an apparatus for the nitration in gaseous phase of organic substances in order to obtain the nitroderivatives of organic substances in the presence of a dispersion of molten salt droplets. Such an apparatus is especially useful for obtaining the nitroderivatives of alkanes and cyclanes, e.g. nitropropane, nitrocyclohexane and others.

As it is generally known, the nitroderivatives of this type are produced by the reaction of organic compounds, especially hydrocarbons, with a nitrating agent such as nitric acid of different concentrations or gas containing nitric oxides at temperatures over 300° C.

The optimal temperature of a given contact time must be closely maintained as its variations appreciably influence the conversion.

It has been found that stainless steel is suitable as a wall material which resists corrosion at the temperatures at which the nitration reaction takes place. Stainless steel also acts as a catalyst in the reaction.

To avoid the inconvenience of the stainless steel acting as an oxidation catalyst, the principal parts of the nitration apparatus must ensure the formation of a pellicle which isolates the metallic walls against the reaction medium. This pellicle is constituted of mineral salts soluble in nitric acid and having a melting point lower than the nitration temperature.

As the nitrations are exothermic reactions, the nitration apparatus must recover the reaction heat using it for the evaporation of nitric acid and maintaining at the same time a reduced temperature gradient inside the reactor.

An important factor in the nitration of organic compounds in gas phase is the mole ratio between the introduced reactants.

The reactions occur with violence at low ratios of the compounds to be nitrated/nitrating agents and the danger of an explosive reaction may even exist. Consequently it is necessary for the apparatus to be designed so as to allow the mixing of the reactants while simultaneously therewith preventing any significant increase in the aforedescribed mole ratios. This design criteria reduces the recirculation characteristics of such an apparatus. Thus if a high molar ratio hydrocarbon (which is to be nitrated) to nitric acid exists, a great amount of hydrocarbon does not react, and, consequently, must be recycled.

The apparatus utilizing nitric acid as nitration agent must prevent its decomposition into nitrogen oxides and water before the reaction takes place, since it is known that the nitrogen oxides give much smaller conversions of the nitrogen.

An apparatus of this kind requires a long mechanical life together with a simple construction. This condition is desirable from an economic standpoint as well as due to the fact that there exists a lack of an advanced technical development in this particular state of the art.

The known nitration reactors are of several types, each with characteristic advantages and disadvantages.

For instance, the tubular type of reactor can maintain the temperature within convenient limits, particularly when a medium is introduced that insures a high thermic transfer. This type of reactor is, however, difficult to construct and requires a high amount of stainless steel as well as a high consumption of thermic energy.

Reactors utilizing fluidized beds or solid particles permit a high heat transfer but have a low productivity because a good part of their volume is filled with a dense suspension. Another inconvenience lies in the fact that the moving particles corrode the steel walls thereby increasing the corrosion and denuding of the steel which, as already mentioned previously, acts as an undesired catalyst.

The apparatus of the chamber type i.e. where the ratio of surface to volume is minimal, is considered as the most advantageous because an empty space is used into which enters through one or more inlets the pre-heated organic compound as well as the nitrating agent. Into the nitric acid, usually diluted nitric acid, are introduced the inorganic salts which will form the insulating pellicle necessary for the reactor protection and the favourable conducting of the reaction. This reactor realizes a high productivity and permits an economy of thermic energy due to the autothermal working of the reaction. However, there exists a disadvantage due to the necessity of complicated installations which require a temperature of approx. 400° C. in a reactor of a 10 meter height as well as special control means for the temperature which varies within a range of approx. 30° C. in the reaction space, leading to conversion reductions.

The utilization of reactors of the bath type in which the nitration is effectuated while both the nitrating agent and the compound to be nitrated traverse in gaseous form a layer of molten salts, leads to a good mixing of the reactor to operate with 1:1 mole ratios and with a good temperature control. However, the productivity of this type of apparatus is low, the heat consumption is high and the nitrogen conversion is small probably owing to the inhibitory effect of the excess salt upon the reaction.

The apparatus utilizing the external recirculation of the molten salts for realizing a dispersion in the reaction space has the advantage of a good temperature control and permits at the same time an autothermic working; this type of apparatus also realizes high conversions owing to the favourable effect of the salt dispersion which in suitable amounts acts as a reaction filter that prevent in part oxidation which proceeds through reaction chains and permits the nitration reactions which proceed only in a few steps of reaction by free radicals. In this apparatus is introduced a mixture formed a priori from nitric acid and alkanes which meet the molten salt flux introduced into the reactor at its top with the aid of a pump after it has been heated to a suitable temperature employing an external heat exchanger. This reactor brings a substantial improvement of the nitration technique but presents nevertheless important disadvantages.

For instance, this type of apparatus requires four operations that must be effectuated outside of the main part of the apparatus, which requires an unjustified extension of the installation and a corresponding increase of the costs for constructing the same. The aforementioned four operations are:

The mixing of the nitrating agent with the organic compound to be nitrated;
The heating of the molten salts to the desired temperature;
The recycling of the molten salts;
The removing of the molten salt droplets that are drawn along with the exiting gas.

In addition to the above mentioned disadvantages it is necessary to consider the fact that the mixing of the reactants in the absence of molten salts and at high temperatures leads to an uncontrolled prereaction or—at best—to a thermic degradation of the nitric acid which causes a perilous working condition, particularly in case of an operation with small mole ratios or in case of the heating of the product to be nitrated to a high temperature. To overcome the difficulties posed by the aforedescribed conditions requires, however, a costly installation which is objectionable from an economic point of view.

The temperature correction by means of an external heat exchanger in an apparatus where the recycling of the molten salts takes place through external pipes, presents serious disadvantages of an economic nature owing to the loss of thermic and electric energy. Furthermore, technical problems are presented, due to the fact that movable parts, such as pumps, are utilized that must operate for a long time at temperatures above 400° C. and under pressure in contact with a very aggressive medium.

The object of the present invention is to provide an apparatus that overcomes to a considerable extent the aforementioned disadvantages by effectuating the auxiliary operations—together or separate—in the reactor itself and by a controlled contacting and mixing of the reactants in the presence of a salt dispersion. By predetermining the water content of the introduced nitric acid the apparatus can be made to operate autothermically.

The novel features which are considered as characteristic for the invention are set forth in particular in the appended claims. The invention itself, however, both as to its construction and its method of operation, together with objects and advantages thereof, will best be understood from the following description of specific embodiments when read in connection with the accompanying drawing, in which the drawing shows a schematic view in elevation of the nitration apparatus with its external heating means, in which the molten salt jets and pellicle are illustrated by means of arrows. Other objectives and advantages of the present invention will result from the description and the accompanying drawing.

The present invention relates in principle to an apparatus consisting of a vertical reaction chamber 1 in frusto-conical shape of stainless steel at the bottom of which is disposed a basin 2 which acts as a collecting vessel for the molten salts which are maintained at suitable temperatures by direct heating or cooling. The external direct heating is simple, economic and can be easily regulated in an exact manner owing to the elevated thermic capacity of the bath. From the bath 2 with the aid of one or more nozzle systems 3, which introduces the reactants, a suitable amount of molten salts is ejected and atomized into the reaction space realizing thereby its recycling. Into the reactor enters through a nozzle system, preferably through a co-axial nozzle 3 the organic compound to be nitrated under pressure and the nitrating agent in the presence or in the absence of homogeneous catalysts i.e. catalysts in gas or vapour form. The organic compound is preheated at a temperature as high as possible without producing its decomposition whereas the nitrating agent is introduced at room temperature when it is liquid and suitably preheated when it is gaseous. The molten salt surface is at a suitable level which ensures the salt aspiration keeping in view the object of the apparatus of forming a salt dispersion with the required density. Due to the interpenetrated jet composed of the compound to be nitrated, the nitrating agent and the salt mixture, there is realized an immediate equalization of the temperature. The latter is due to the great heat quantity by means of the salt, and a good mixing of the reactants, and also by preventing a previous decomposition of the nitrating agent and of the compound to be treated. The jet formed by the gas mixture and the molten salt dispersion encounters during its ascension an enlargement of the reactor section which leads to a loss of the kinetic energy of a part of its droplets which fall back into the basin. At the upper part of the apparatus in the exit way of the reactants is disposed a separating device 4 for blocking the remaining salt droplets, this device for instance is formed of baffles. These baffles lead the recovered molten salt droplets upon the reactor walls so that they may form a continuous pellicle and fall back into the basin located in the lower part of the reaction chamber 1 part. The reaction gas, liberated from the salts, leaves the reaction space, passes through a cooling system and is afterwards processed under the usual conditions.

The nitric acid is fed into all of the aforedescribed reaction chambers in the liquid state; the heating up of the nitric acid outside the reaction chamber 1 is thereby avoided.

Thus, in addition to an improvement in efficiency, a better control of the temperature is achieved. The evaporation of the nitric acid and of the water serve to remove the reaction heat from the reaction chamber 1. Thus, there is achieved by the said dispersion and evaporation of the nitric acid solution a practically isothermal reaction in the chamber, the temperature being maintained within a range of ±5° C.

The following examples show the characteristics of the present invention. It is obvious that these examples are only illustrative and are not intended to limit the scope of the invention.

EXAMPLE 1

Into a reactor made out of a steel alloy having 18% chrome and 8% nickel content comprising a lower part of cylindrical shape and an upper part of frusto-conical shape with its larger base directed upwards, are introduced through a system of coaxial pipes, for each liter of reactor capacity and for each hour, 665 normal liter of propane preheated to 500° C. and 0.465 liter nitric acid of 50% weight concentration. The preheated propane penetrates through the outer pipe with a pressure difference of approx. 6 at. in comparison with the pressure in the reactor which is slightly superatmospheric, whereas the liquid nitric acid is introduced with the aid of a plunger pump (not illustrated) through the inner pipe. After the passing of propane and nitric acid each through a circular pipe with a nozzle having a narrowed circular section at the ejection end, the reactants are expanded and they are mixed with the molten salts which are aspired through a third nozzle, the lower part of which extends into the salt bath. This salt bath is directly heated with combustion gas to 420° C. and is provided with automatic control devices (not illustrated) of the temperature and the molten salt level. The level correction is realized with the aid of an annexed vessel (not illustrated) containing molten salts which are also placed in the same furnace zone.

After the propane, nitric acid and the molten salt have been brought together, the latter owing to its mass and specific heat instantaneously elevated the temperature of the mixture to the required temperature of 415° C.; the propane and nitric acid then react in the course of 1.4 seconds which is the contact time calculated on the reaction space free of salt bases. The max. temperature difference in the reaction space is not higher than 5° C.

The reaction mixture after passing through the enlarged zone of the section of the reactor meets a baffle in the form of an umbrella. The reaction mixture moves around this umbrella shaped baffle and at its backside enters into the outflowing pipe of the reactor. The said baffle has the role to prevent an escape of the salt droplets, leading them back upon the reactor walls.

After condensation of the effluent gas there is obtained 0.147 kg. nitroalkanes for each liter reactor space and hour corresponding to a conversion of 36% in relation to the nitric acid. The uncondensed gas carries also an amount of nitroalkanes which raises the conversion by another 4% amounting for each passage to a total conversion of 40% in relation to the nitric acid.

EXAMPLE 2

Into the reactor described in Example 1 are introduced cyclohexane in vapour form at a pressure of 10 at. preheated to 430° C. and nitric acid of 50% weight concentration, in a mole ratio of 2:1. The reactor feeding is regulated to obtain a contact time of 1.2 seconds at a reaction temperature of 405° C. and under a pressure of 6 at.

After leaving the reactor the gas is condensed and cooled resulting in:

Gas which contains about 50% nitric acid oxides and up to 20% nitrogen, as well as 36% of other gases, especially carbon dioxide and monoxide.

An organic layer constituted of unreacted cyclohexane and of reaction products. These latter are constituted of 65% nitroderivatives (nitrocyclohexane, nitropentane, nitrobutane etc.), 14% cyclohexanol, 4% cyclohexanone, 10% lower fatty acids and 3% esters.

An aqueous layer containing about 3% unreacted nitric acid and 4% dicarboxylic acids.

The yield of nitrocyclohexane amounts to 60% and the conversion based on the cyclohexane for each passage is 7.5%. Of the introduced quantity of nitric acid, 15% reacts yielding nitrocyclohexane, 59% yielding nitric oxide which is afterwards recovered, 4.6% lower nitroalkanes and about 22% are lost in form of unrecoverable gas and diluted nitric acid.

A reactor of 6 liters charged with 20% vol. salts yields at a pressure of 6 at. about 100 kg. nitrocyclohexane per day.

From the above description it will be evident that the invention presents a new and improved apparatus for nitrating in gaseous phase having many advantages in comparison with the known apparatuses. The present invention discloses an apparatus for the nitration of organic compounds in the gaseous phase that has a great simplicity, working security and chemical efficiency and is as well cheap to manufacture and maintain. Furthermore, the apparatus forming part of this invention also presents certain thermic and electric energy economies. At the same time the construction and working of such a reactor are distinguished by a high degree of efficiency.

Without further analysis, it will be obvious to those skilled in the art, upon a study of this disclosure, that this invention permits various modifications and alterations without omitting features that, from the standpoint of prior art, fairly constitute essential characteristics of the generic or specific aspects of this invention, and, therefore, such modifications, and alterations are intended to be comprehended within the meaning, scope and range of equivalence of the following claims.

What we claim is:

1. An apparatus for the vapor phase nitration of hydrocarbons, comprising a reaction chamber, said reaction chamber having top exit means and bottom inlet means, the bottom region of said reaction chamber defining a basin for storing a molten salt medium at a predetermined level, first and second nozzle means coaxially arranged with respect to each other and extending via said inlet means above said predetermined level of said molten salt medium and third nozzle means arranged over said first and second nozzle means, the bottom portion of said third nozzle extending below said predetermined level of said molten salt medium, whereby a fluid stream comprising hydrocarbon gas, liquid nitric acid and said molten salt medium which exit respectively from said first, second and third nozzle means is atomized within said reaction chamber favoring thereby the nitration of said hydrocarbon gas.

2. The apparatus as defined in claim 1, wherein the walls of said reaction chamber consist of stainless steel.

3. The apparatus as set forth in claim 1, wherein the walls of said reaction chamber consist of a steel alloy having about 18% chrome content and about 8% nickel content.

4. The apparatus as set forth in claim 1, including external heating means for heating said reaction chamber mounted adjacent to said reaction chamber.

5. The apparatus as set forth in claim 1, wherein the lower part of said reaction chamber is of cylindrical shape and the upper part of said reaction chamber is of frustoconical shape.

6. Apparatus for the vapor phase nitration of hydrocarbons, comprising a reaction chamber having top exit means and bottom inlet means, the bottom region of said reaction chamber defining a basin for storing a salt melt at a predetermined level, first pipe means extending into said reaction chamber via said inlet means, second pipe means coaxially arranged inside said first pipe means, said first and second pipe means having respectively nozzle means at their forward ends, said nozzle means of said first pipe means extending above said predetermined level of said salt melt, third nozzle means coaxially arranged over said nozzle means having a bottom region extending below said predetermined level of said salt melt, and impact member mounted in the top region of said reaction chamber immediately below said top exit means, for blocking the exit path of said salt melt through said exit means, whereby a fluid stream comprising hydrocarbon gas, liquid nitric acid and said salt melt which exit respectively from said first and second pipe means and said third nozzle means is atomized within said reaction chamber favoring thereby the nitration of said hydrocarbon gas.

7. Apparatus for the vapor phase nitration of hydrocarbons, comprising a reaction chamber having top exit means and bottom inlet means, the bottom region of said reaction chamber defining a basin for storing a salt melt at a predetermined level, first pipe means axially extending via said inlet means for conducting a hydrocarbon gas into said reaction chamber, second pipe means coaxially arranged inside first pipe means for conducting a liquid nitric acid into said reaction chamber, said first and second pipe means having respectively nozzle means at their forward ends, said nozzle means of said first pipe means extending above said predetermined level of said salt melt, third nozzle means coaxially arranged over said nozzle means of said first and second pipe means, said third nozzle means having a bottom region extending below said predetermined level of said salt melt, and an impact member mounted within said reaction chamber in the top region thereof immediately below said top exit means, whereby a fluid stream comprising hydrocarbon gas, liquid nitric acid and salt melt which exit respectively from said first and second pipe means and said third nozzle means is atomized within said reaction chamber favoring thereby the nitration of said hydrocarbon gas.

References Cited by the Examiner
UNITED STATES PATENTS

| | | | |
|---|---|---|---|
| 179,977 | 7/1876 | Turrenttini | 261—77 X |
| 1,536,463 | 5/1925 | Westling | 23—285 X |
| 2,260,258 | 10/1941 | Martin | 260—644 |
| 2,760,847 | 8/1956 | Oblad et al. | 23—259 X |
| 2,905,724 | 9/1959 | Martin | 260—644 |

MORRIS O. WOLK, *Primary Examiner.*

JOSEPH SCOVRONEK, *Assistant Examiner.*